United States Patent
Irie

(10) Patent No.: US 10,611,403 B2
(45) Date of Patent: Apr. 7, 2020

(54) STEERING DEVICE FOR CONSTRUCTION/TRANSPORT/FARM MACHINE

(71) Applicant: Eaton Industries (Japan) Ltd., Minato-ku, Tokyo (JP)

(72) Inventor: Sadao Irie, Takatsuki (JP)

(73) Assignee: Eaton Intelligent Power Limited, Dublin (IE)

( * ) Notice: Subject to any disclaimer, the term of this patent is extended or adjusted under 35 U.S.C. 154(b) by 239 days.

(21) Appl. No.: 15/738,989

(22) PCT Filed: Jun. 20, 2016

(86) PCT No.: PCT/JP2016/068225
§ 371 (c)(1),
(2) Date: Dec. 21, 2017

(87) PCT Pub. No.: WO2016/208530
PCT Pub. Date: Dec. 29, 2016

(65) Prior Publication Data
US 2018/0186402 A1 Jul. 5, 2018

(30) Foreign Application Priority Data
Jun. 23, 2015 (JP) .................................. 2015-125456

(51) Int. Cl.
*B62D 5/07* (2006.01)
*B62D 5/09* (2006.01)
*B62D 1/22* (2006.01)

(52) U.S. Cl.
CPC ............... *B62D 5/075* (2013.01); *B62D 1/22* (2013.01); *B62D 5/09* (2013.01); *B62D 5/091* (2013.01)

(58) Field of Classification Search
CPC .......... B62D 5/075; B62D 5/091; B62D 5/07; B62D 5/09
(Continued)

(56) References Cited

U.S. PATENT DOCUMENTS

| 5,960,694 A | 10/1999 | Thomas et al. |
| 7,931,112 B2 | 4/2011 | Gehlhoff |

(Continued)

FOREIGN PATENT DOCUMENTS

| JP | 2005-535487 A | 11/2005 |
| WO | 2013/145334 A1 | 10/2013 |

OTHER PUBLICATIONS

International Search Report and Written Opinion of the International Searching Authority for corresponding International Patent Application No. PCT/JP2016/068225 dated Sep. 6, 2016, 6 pages.

*Primary Examiner* — Anne Marie M Boehler
(74) *Attorney, Agent, or Firm* — Merchant & Gould P.C.

(57) ABSTRACT

In order to provide a steering device for a construction/transport/farm machine which can be steered by means of a steering wheel operation and by means of a lever operation (or automatic steering) such that not only can a mechanism for prioritizing the steering wheel operation be achieved with a simple configuration, but the mechanism can also be caused to stably operate, the steering device is provided with: steering cylinders 1; a steering valve 2; a pump 3; a steering wheel control valve 4; an electromagnetic control valve 5 for lever/automatic steering; a steering wheel priority valve 6; and a change-over valve 7 which, upon sensing a load pressure generated when the steering wheel control valve 4 is operated, switches the setting of the steering wheel priority valve 6 by using the load pressure, wherein the change-over valve 7 for switching the setting of the steering wheel priority valve 6 has a two-port two-position configuration whereby a drain oil passage of the (Continued)

steering wheel priority valve 6 is closed by utilizing the load pressure generated when the steering wheel control valve 4 is operated.

5 Claims, 8 Drawing Sheets

(58) Field of Classification Search
USPC .................................................. 180/441, 442
See application file for complete search history.

(56) References Cited

U.S. PATENT DOCUMENTS

| | | |
|---|---|---|
| 7,984,785 B2 | 7/2011 | Cadman et al. |
| 9,200,645 B2 | 12/2015 | Krahn |
| 9,512,838 B2 | 12/2016 | Krahn et al. |
| 2006/0131098 A1* | 6/2006 | Schmidt ................ B62D 5/075 180/417 |
| 2010/0101888 A1* | 4/2010 | Nakamura ............... B62D 1/22 180/442 |
| 2010/0212994 A1* | 8/2010 | Nicklin .................... B62D 1/22 180/422 |
| 2012/0204549 A1 | 8/2012 | Gehlhoff |
| 2014/0083792 A1 | 3/2014 | Imanishi et al. |
| 2015/0158522 A1 | 6/2015 | Thayer |

* cited by examiner

STEERING DEVICE FOR CONSTRUCTION/TRANSPORT/FARM MACHINE

This application is a National Stage Application of PCT/JP2016/068225, filed 20 Jun. 2016, which claims benefit of Serial No. 2015-125456, filed 23 Jun. 2015 in Japan and which application are incorporated herein by reference. To the extent appropriate, a claim of priority is made to each of the above disclosed applications.

TECHNICAL FIELD

The present invention is related to a steering device, especially a steering device for a construction/transportation machine such as a wheel loader, and for a farm machine such as a tractor.

BACKGROUND ART

A construction/transport/farm machine such as a wheel loader have a steering wheel to perform a steering operation when running with high speed on a public road or a work site. Also, in the work site such that repeating short distance driving and the steering operation, a lever like a joystick is provided to perform a steering operation efficiently by a simple operation.

Thus in the wheel loader capable of operating the steering operation by both of a steering wheel operation and a lever operation, the steering operation is performed unintentionally when a driver touches the lever accidentally during the steering wheel operation.

To address this problem, a control device is disclosed that performs prior the steering wheel operation when the steering wheel and the lever are operated simultaneously (For example: Patent literature 1).

In the control device disclosed in Patent literature 1, a sequence valve that is attached to a control valve for a lever operation is provided. Then, when the steering wheel operation is performed, the sequence valve is operated by hydraulic oil flowing in the control valve for the steering wheel operation and the supply of the hydraulic oil from the control valve for lever operation to a steering cylinder is stopped.

PRIOR ART DOCUMENTS

Patent Literature

[Patent Literature 1] Japan Patent Publication Tokuhyo (Japan Unexamined Patent Publication) 2005-535487.

SUMMARY OF INVENTION

Technical Problem

Thus in the control device disclosed in Patent literature 1, two electromagnetic control valves and the sequence valve are provided as a means for prioritizing the steering wheel operation, which are separately from the control valve for the steering wheel operation and the control valve for the lever operation.

Therefore in such configuration, a mechanism for prioritizing the steering wheel operation becomes complex.

Also, in the control device of Patent literature 1, the sequence valve and electromagnetic control valves are operated by the hydraulic oil flowing in the valve for the steering wheel operation and both ends of the control valve for the lever operation become equal pressure. Thereby the supply of the hydraulic oil, from the lever operation control valve into the steering cylinder, is stopped.

Therefore in such configuration, the operation of the sequence valve becomes unstable depending on amount of the hydraulic oil flowing in the steering wheel control valve and the steering wheel operation cannot be always and surely performed prior to being prioritized reliably.

An object of the present invention is to provide a steering device of a construction/transport/farm machine capable of operating a steering operation by a steering wheel operation and a lever operation (or an automatic steering) so that a mechanism for prioritizing the steering wheel operation is realized with a simple configuration and also the mechanism is operated stably, considering a problem in the steering device of the conventional construction/transport/farm machine.

Solution to Problem

In order to achieve the object, the steering device of the construction/transport/farm machine of invention of the present invention comprises a steering cylinder, a steering valve, a pump, a steering wheel control valve, an electromagnetic control valve for lever or automatic steering, a steering wheel priority valve, and a change-over valve for sensing load pressure generated when the steering wheel control valve is operated and for changing the steering wheel priority valve by the pressure. The change-over valve for changing the steering wheel priority valve comprises a two-port two-position configuration for closing a drain oil passage of the steering wheel priority valve by using the load pressure generated when the steering wheel control valve is operated.

Also, in order to achieve the same object, a steering device of a construction/transport/farm machine of invention 2 of the present invention comprises a steering cylinder, a priority valve, a pump, a steering wheel control valve, a electromagnetic control valve for lever or automatic steering, a steering wheel priority valve, and a change-over valve for sensing load pressure generated when the steering wheel control valve is operated and for changing the steering wheel priority valve by the pressure. The change-over valve for changing the steering wheel priority valve comprises a two-port two-position configuration for closing a drain oil passage of the steering wheel priority valve by using the load pressure generated when the steering wheel control valve is operated.

Also, in order to achieve the same object, a steering device of a construction/transport/farm machine of invention 3 of the present invention comprises a steering cylinder, an unload valve (a flow control valve), a pump, a steering wheel control valve, an electromagnetic control valve for lever or automatic steering, a steering wheel priority valve, and a change-over valve for sensing load pressure generated when the steering wheel control valve is operated and for changing the steering wheel priority valve by the pressure. The change-over valve for changing the steering wheel priority valve comprises a two-port two-position configuration for closing a drain oil passage of the steering wheel priority valve by using the load pressure generated when the steering wheel control valve is operated.

Also, in the steering device for the construction/transport/agricultural machine according to one of inventions 1 to 3 of the present invention, the steering device further comprises a mode change valve for changing a steering wheel operation or a lever or automatic steering operation to the pilot oil passage for changing the steering wheel priority valve. The pilot oil passage is blocked by the mode change valve operated by an external signal so that the electromagnetic control valve for lever or automatic steering and the steering cylinder become in a non-communicated state.

Also, in the steering device for the construction/transport/agricultural machine according to invention 2 or 3 of the present invention, a selector valve is used as the steering wheel priority valve and comprises a stage for communicating the steering wheel control valve and the steering cylinder, and a stage for communicating the electromagnetic control valve for lever or automatic steering and the steering cylinder.

Advantageous Effects of Invention

According to the steering device of the construction/transport/farm machine of inventions 1 to 3 of the present invention, in the construction/transport/farm machine that is capable of operating the steering operation by the steering wheel operation and the lever operation (or the automatic steering), the mechanism for prioritizing the steering wheel operation is realized with a simple configuration and also the mechanism can be operated stably.

Also, in the steering device of the construction/transport/farm machine of inventions 1 to 3 of the present invention, it is provided that the mode change valve for changing the steering wheel operation or the lever or automatic steering operation to the pilot oil passage for changing the steering wheel priority valve. The pilot oil passage is blocked by the mode change valve operated by an external signal so that the electromagnetic control valve for lever or automatic steering and the steering cylinder become in a non-communicated state. Therefore when the electromagnetic control valve for lever or automatic steering fells down to the neutral return bug, the dangerous situation can be easily avoided without operating continuously the steering wheel control valve.

Also, in the steering device of the construction/transport/farm machine of invention 2 or 3 of the present invention, the selector valve is used as the steering wheel priority valve and comprises the stage for communicating the steering wheel control valve and the steering cylinder, and the stage for communicating the electromagnetic control valve for lever or automatic steering and the steering cylinder. Therefore, when adopting the steering wheel control valve for a load reaction mechanism that transmits load reaction force of a road surface to the steering wheel through the steering cylinder, the risk that the steering wheel rotates accidentally in the reverse direction can be prevented while the electromagnetic control valve for lever or automatic steering is being operating.

DESCRIPTION OF EMBODIMENTS

Hereinafter, an embodiment of a steering device of a construction/transport/farm machine of the present invention will be described based on drawings.

[Steering Wheel Operation Priority in Closed Center System]

Figure 1:
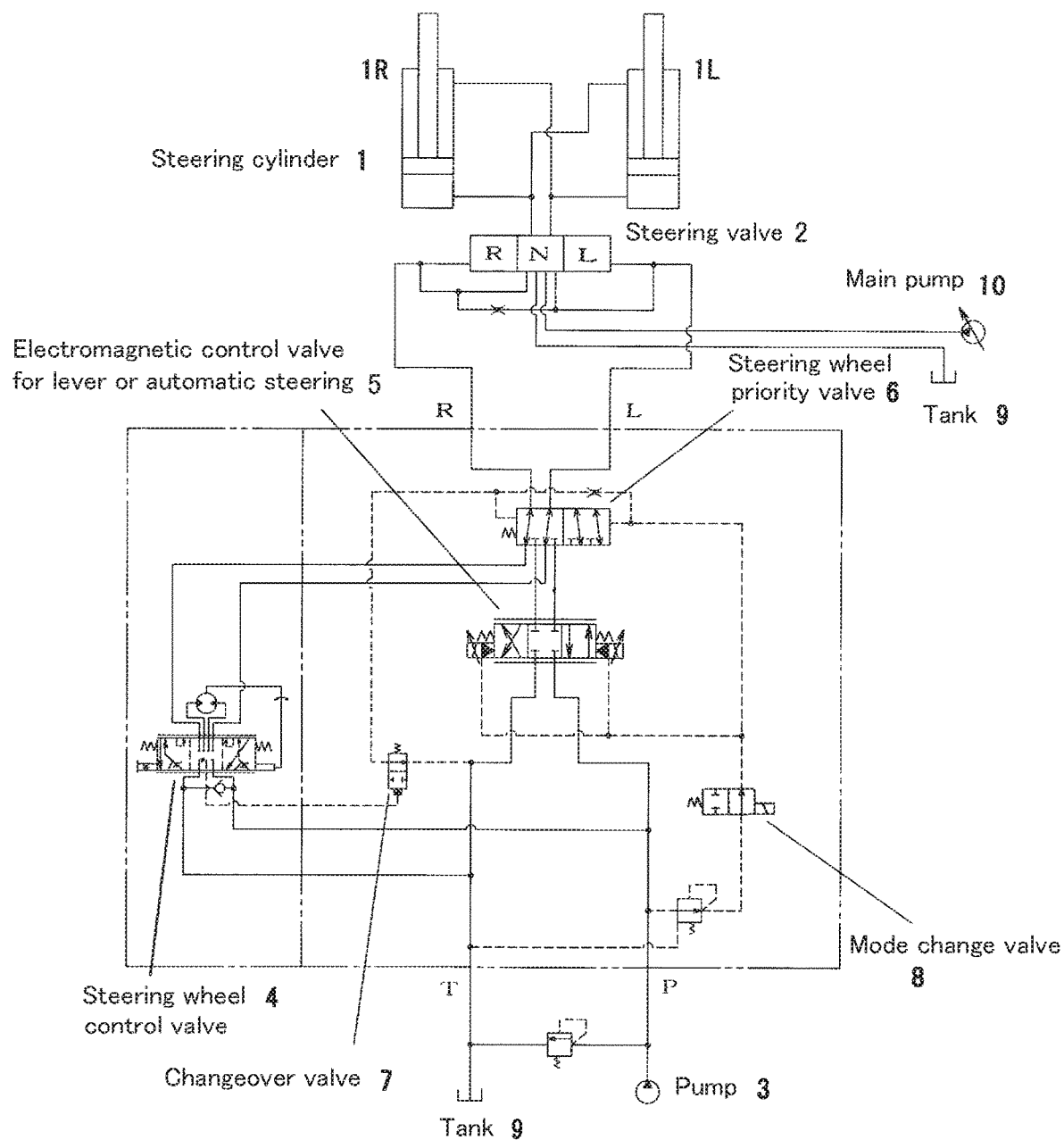
FIG. 1 is an explanatory drawing illustrating a system configuration (Steering wheel operation priority in closed center system) of a steering device of a construction/transport/agricultural machine of invention 1 of the present invention.

FIG. 1 is illustrating a system configuration (Steering wheel operation priority in closed center system) of the steering device of the construction/transport/agricultural machine of invention 1 of the present invention.

This steering device comprises a steering cylinder 1, a steering valve 2, a pump 3, a steering wheel control valve 4 operated by a steering wheel operated rotatively, an electromagnetic control valve 5 for lever or automatic steering operated by a joystick operated by tilting or by an automatic steering mechanism, a steering wheel priority valve 6, a change-over valve 7, a mode change valve 8, a tank 9, and a main pump 10.

The steering wheel and the joystick or the automatic steering mechanism are elements operated for steering. By operating these elements, the steering cylinder 1 is expanded/contracted and a front frame or a tire of the construction/transport/farm machine is rotated.

Here ORBITROL(Registered trademark) can be used appropriately for the steering wheel control valve 4.

The steering valve 2 provides hydraulic oil which is from the main pump 10 into the steering cylinder 1 according to a pilot hydraulic pressure from the steering wheel control valve 4 or the electromagnetic control valve 5 for lever or automatic steering.

Specifically, the steering valve 2 is switched to a left turning stage L when the hydraulic oil is provided to a left pilot port, and is switched to a right turning stage R when the hydraulic oil is provided to a right pilot port. When the steering valve 2 is switched to the left turning stage L, the hydraulic oil from the main pump 10 is provided to a bottom side oil chamber of a left steering cylinder 1 L and a rod side oil chamber of a right steering cylinder 1 R. The hydraulic oil inside a bottom side oil chamber of the right steering cylinder 1 R and a rod side oil chamber of the left steering cylinder 1 L is returned to the tank 9 through a drain oil passage. In reverse, when the steering valve 2 is switched to the right turning stage R, the hydraulic oil from the main pump 10 is provided to the bottom side oil chamber of right steering cylinder 1 R and the rod side oil chamber of the left steering cylinder 1 L. The hydraulic oil inside the bottom side oil chamber of the left steering cylinder 1 L and the rod side oil chamber of the right steering cylinder 1 R is returned to the tank 9 through the drain oil passage. Also, when the hydraulic oil is not provided to the left and right pilot ports, the steering wheel valve 2 is switched to a neutral stage N, therefore the drain oil passage between the cylinders of the right and the left steering cylinders 1 R, 1L and the tank 9 is blocked.

Also, the both pilot ports of the steering valve are communicated through a throttle. Then, when the hydraulic oil is being provided to one port of the pilot ports, the hydraulic oil in the oil passage of another port of the pilot ports is returned to the tank 9 through the steering wheel control valve 4 or the electromagnetic control valve 5 for lever or automatic steering and the drain oil passage.

The steering wheel control valve 4 discharges the hydraulic oil proportion to the direction of the steering wheel from the right or left ports according to the rotational direction of the steering wheel.

Oil passages from the steering wheel control valve 4 are connected respectively to the left and right pilot ports of the steering valve 2 through the steering wheel priority valve 6.

Ports of the input side of the steering wheel control valve 4 are connected to the pump 3 and the tank 9 through oil passages.

Ports of the input side of the electromagnetic control valve 5 for lever or automatic steering are connected to the pump 3 and tank 9 through oil passages. The electromagnetic control valve 5 for lever or automatic steering vomits the hydraulic oil input from the ports to ports of an output side according to the operation of the joystick. A steering wheel priority valve 6 is provided in the output side port of the electromagnetic control valve 5 for lever or automatic steering.

Then the hydraulic oil from the electromagnetic control valve 5 for lever or automatic steering is provided to each pilot port of the steering valve 2 through the steering wheel priority valve 6.

The change-over valve 7 for changing the steering wheel priority valve 6 comprises a two-port two-position configuration that closes a drain oil passage of the steering wheel priority valve 6 using by means of load pressure generated when the steering wheel control valve 4 is operated.

Then when the steering wheel is operated, the hydraulic oil is input into the steering wheel control valve 4. At this time, the change-over valve 7 for changing the steering wheel priority valve 6 senses the load pressure (higher pressure) generated when the steering wheel control valve 4 is operated and the change-over valve 7 closes the drain oil passage of the steering wheel priority valve 6 by means of the pressure. Thereby, when the steering wheel is operated, the hydraulic oil from the electromagnetic control valve 5 for lever or automatic steering is blocked by the steering wheel priority valve 6 and the steering wheel operation is prioritized even if the joystick is misoperated by an operator who touches the joystick accidentally.

According to this steering device, a mechanism for prioritizing the steering wheel operation is realized with a simple configuration and also the mechanism can be operated stably by constituting the change-over valve 7 for changing the steering wheel priority valve 6 so that the change-over valve 7 is comprised of the two-port two-position configuration that blocks the drain oil passage of the steering wheel priority valve 6 by the means of the load pressure generated when the steering wheel control valve 4 is operated.

[Mode Change Valve Operation in Closed Center System]

Figure 2:
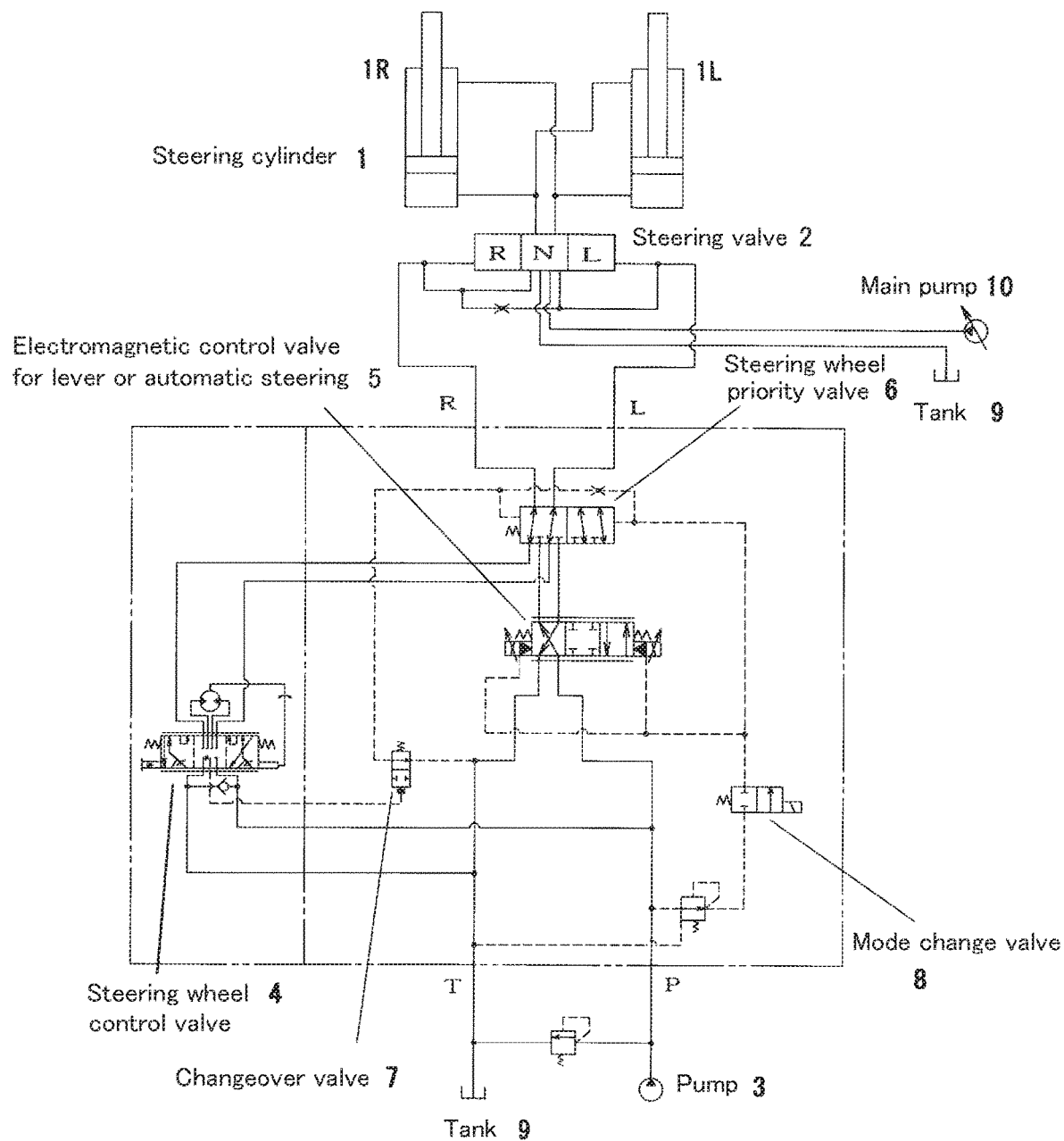
FIG. 2 is an explanatory drawing illustrating a system configuration (Mode change valve operation in closed center system) of a steering device of a construction/transport/agricultural machine of invention 1 of the present invention.

FIG. 2 is illustrating a system configuration (Mode change valve operation in closed center system) of the steering device of the construction/transport/agricultural machine of invention 1 of the present invention.

This steering device comprises the mode change valve 8 for changing a steering wheel operation or a lever or automatic steering operation in a pilot oil passage for changing the steering wheel priority valve 6. Then, a pilot oil passage is blocked by this mode change valve 8 operated by an external signal so that the electromagnetic control valve 5 for lever or automatic steering and the steering cylinder 1 become in a non-communicated state. Therefore, when the electromagnetic control valve 5 for lever or automatic steering falls into to a neutral return trouble, the dangerous situation can be easily avoided without operating continuously the steering wheel control valve 4.

[Steering Wheel Operation Priority in Road Sensing System]

Figure 3:
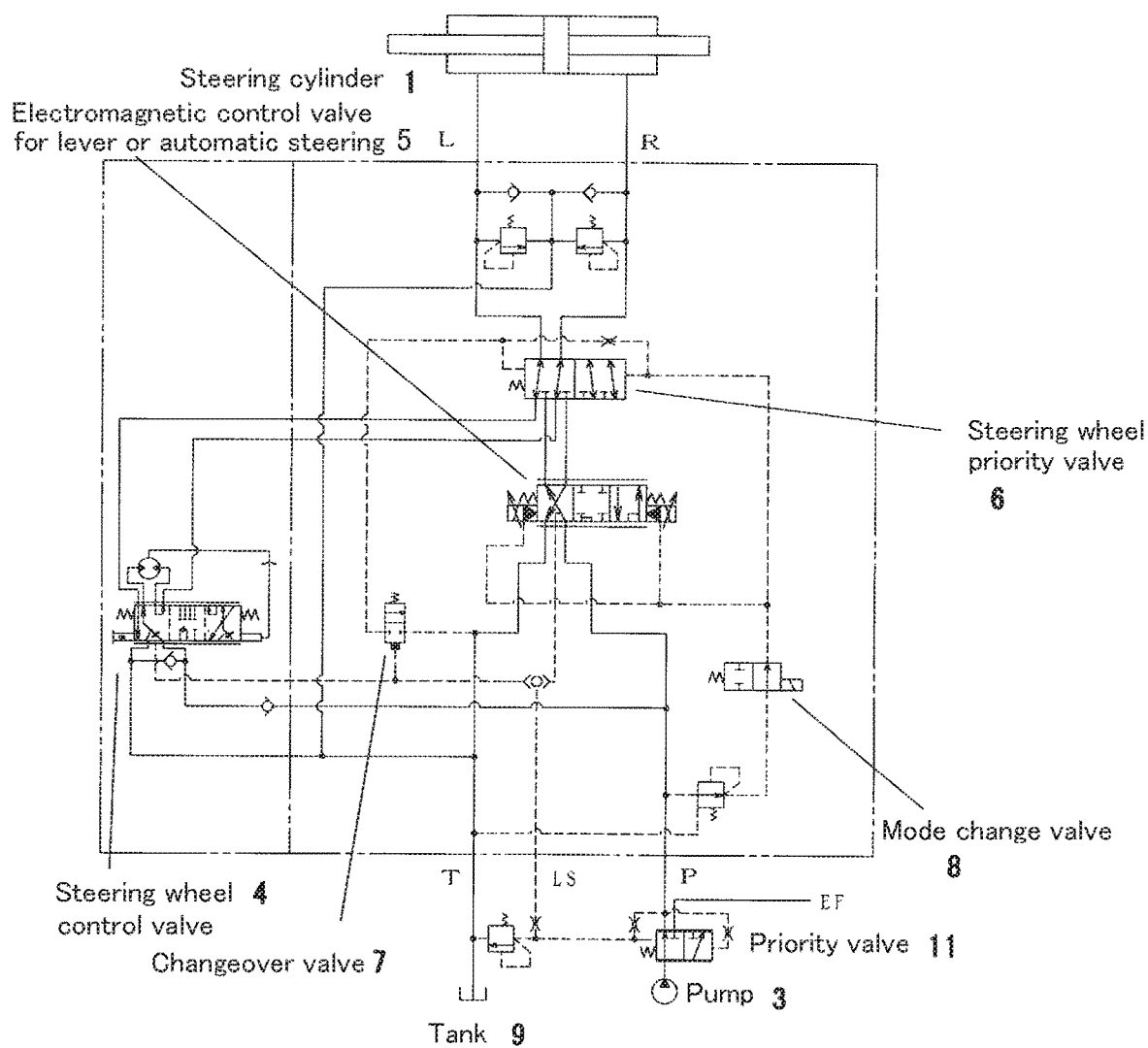
FIG. 3 is an explanatory drawing illustrating a system configuration (Steering wheel operation priority in road sensing system) of a steering device of a construction/transport/agricultural machine of invention 2 of the present invention.

FIG. 3 is illustrating a system configuration (Steering wheel operation priority in road sensing system) of a steering device of a construction/transport/agricultural machine of invention 2 of the present invention.

This steering device comprises a steering cylinder 1, a pump 3, a steering wheel control valve 4 operated by a steering wheel operated rotatively, an electromagnetic control valve 5 for lever or automatic steering operated by a joystick operated by tilting or by an automatic steering mechanism, a steering wheel priority valve 6, a change-over valve 7, a mode change valve 8, a tank 9 and a priority valve 11.

The steering wheel and the joystick or the automatic steering mechanism are elements operated for steering. By operating these elements, the steering cylinder 1 is expanded/contracted and a front frame or a tire of the construction/transport/farm machine is rotated.

In this steering device, to provide hydraulic oil from the pump 3 directly into the steering cylinder 1 through the steering wheel control valve 4 or the electromagnetic control valve 5 for lever or automatic steering, a steering valve 2 is not provided.

The change-over valve 7 for changing the steering wheel priority valve 6 comprises a two-port two-position configuration that closes a drain oil passage of the steering wheel priority valve 6 by using the load pressure generated when the steering wheel control valve 4 is operated.

Then, when the steering wheel is operated, the hydraulic oil is input into the steering wheel control valve 4. At this time, the change-over valve 7 for changing the steering wheel priority valve 6 senses the load pressure (higher pressure) generated when the steering wheel control valve 4 is operated and the change-over valve 7 closes the drain oil passage of the steering wheel priority valve 6 by means of the pressure. Thereby, when the steering wheel is operated, the hydraulic oil from the electromagnetic control valve 5 for lever or automatic steering is blocked by the steering wheel priority valve 6 and the steering wheel operation is prioritized even the joystick is misoperated by an operator who touches the joystick accidentally.

According to this steering device, a mechanism for prioritizing the steering wheel operation is realized with a simple configuration and also the mechanism can be operated stably by constituting the change-over valve 7 for changing the steering wheel priority valve 6 so that the change-over valve 7 is comprised the two-port two-position configuration that blocks the drain oil passage of the steering wheel priority valve 6 by the means of the load pressure generated when the steering wheel control valve 4 is operated.

[Mode Change Valve Operation in Load Sensing System]

Figure 4:
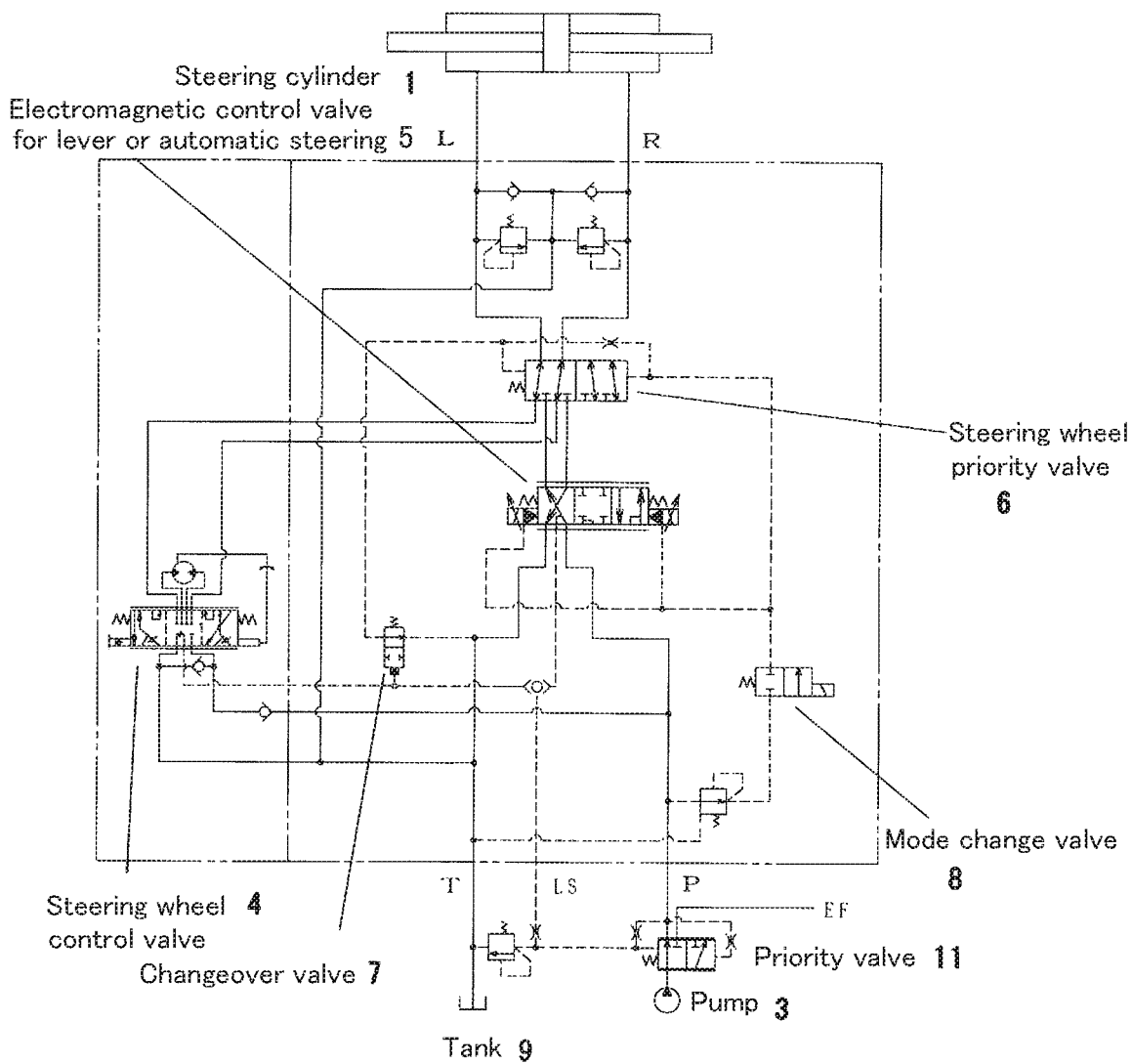
FIG. 4 is an explanatory drawing illustrating a system configuration (Mode change valve operation in load sensing system) of a steering device of a construction/transport/agricultural machine of invention 2 of the present invention.

FIG. 4 is illustrating a system configuration (Mode change valve operation in load sensing system) of the steering device of the construction/transport/agricultural machine of invention 2 of the present invention.

This steering device comprises the mode change valve 8 for changing a steering wheel operation or a lever or automatic steering operation in a pilot oil passage for changing the steering wheel priority valve 6. Then, a pilot oil passage is blocked by this mode change valve 8 operated by an external signal so that the electromagnetic control valve 5 for lever or automatic steering and the steering cylinder 1 become in a non-communicated state. Therefore, when the electromagnetic control valve 5 for lever or automatic steering neutral return trouble, the dangerous situation can be easily avoided without operating continuously the steering wheel control valve 4.

[Load Reaction Mechanism Operation in Load Sensing System]

Figure 5:
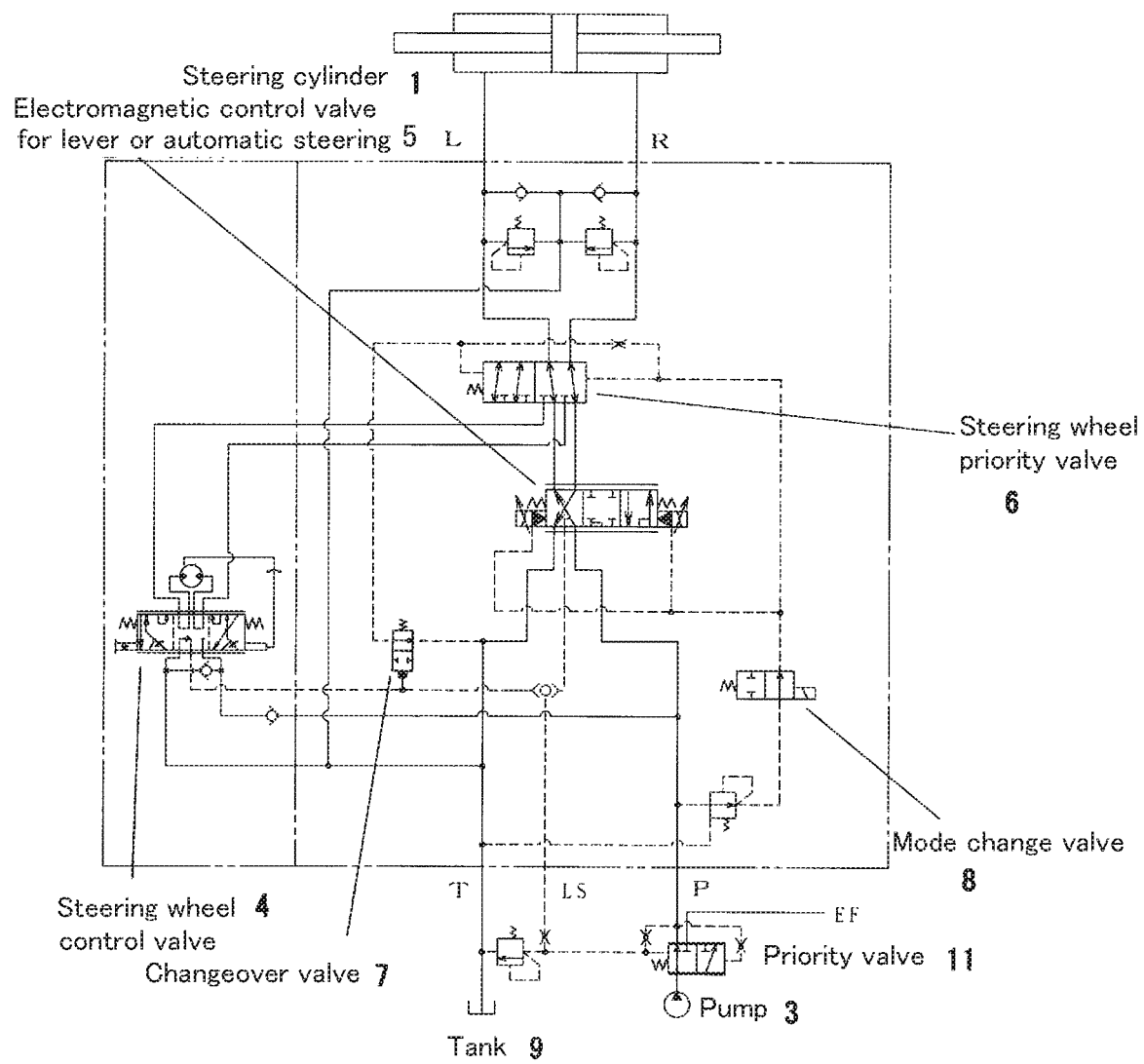
FIG. 5 is an explanatory drawing illustrating a system configuration (Load reaction mechanism operation in load sensing system) of a steering device of a construction/transport/agricultural machine of invention 2 of the present invention.

FIG. 5 is illustrating a system configuration (Load reaction mechanism operation in load sensing system) of the steering device of the construction/transport/agricultural machine of the present second invention.

Also, in this steering device, a selector valve is used as the steering wheel priority valve 6 and comprises a stage for communicating the steering wheel control valve 4 and steering cylinder 1, and a stage for communicating the electromagnetic control valve 5 for lever or automatic steering and the steering cylinder 1. Therefore, when adopting the steering wheel control valve 4 for a load reaction mechanism that transmits load reaction force of a road surface to the steering wheel through the steering cylinder 1, the risk that the steering wheel rotates accidentally in the reverse direction can be prevented while the electromagnetic control valve 5 for lever or automatic steering is being operating.

[Steering Wheel Operation Priority in Open Center System]

Figure 6:
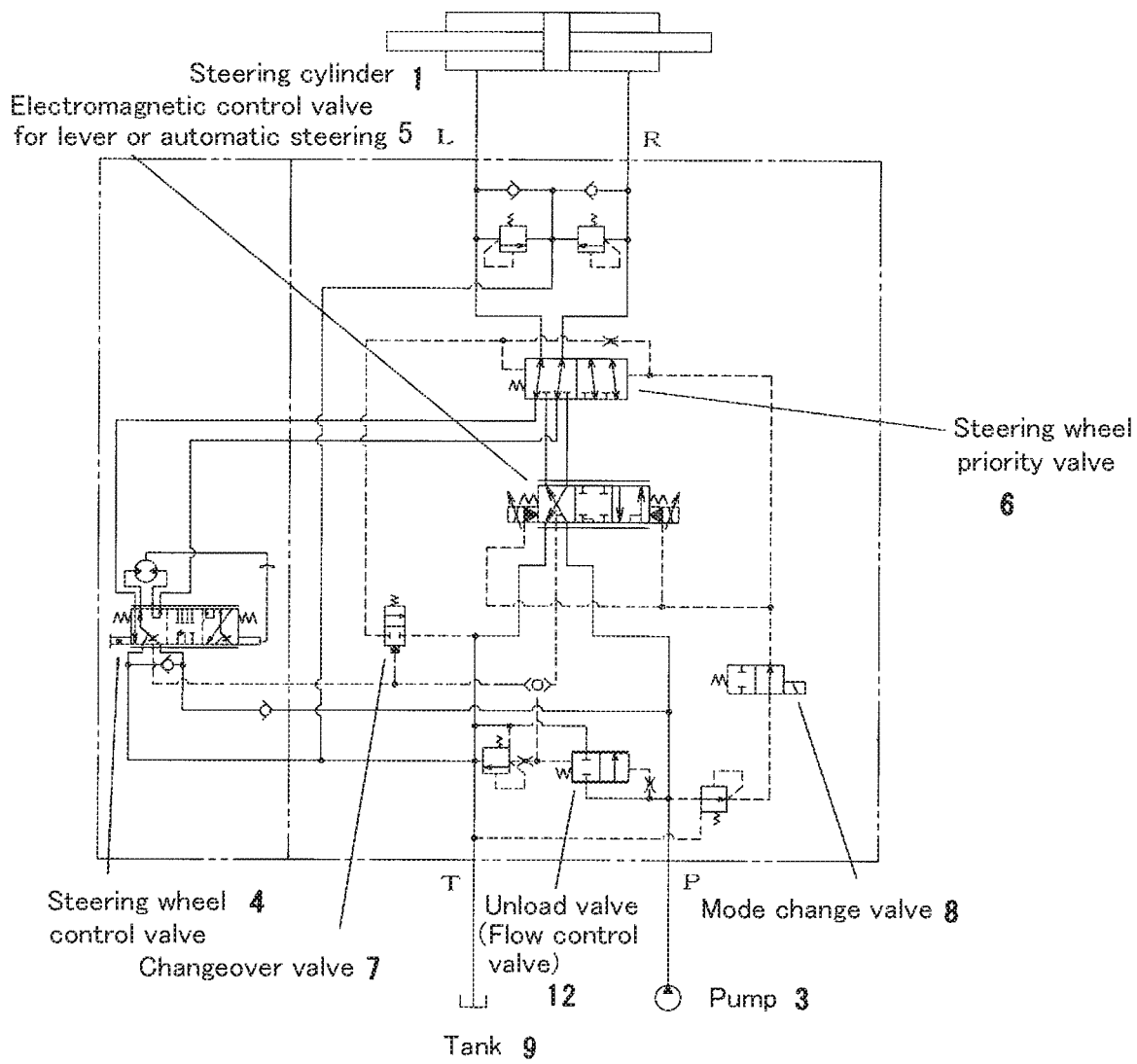
FIG. 6 is an explanatory drawing illustrating a system configuration (Steering wheel operation priority in open center system) of a steering device of a construction/transport/agricultural machine of invention 3 of the present invention.

FIG. 6 is illustrating a system configuration (Steering wheel operation priority in open center system) of a steering device of a construction/transport/agricultural machine of invention 3 of the present invention.

This steering device comprises a steering cylinder 1, a pump 3, a steering wheel control valve 4 operated by a steering wheel operated rotatively, an electromagnetic control valve 5 for lever or automatic steering operated by a joystick operated by tilting or by an automatic steering mechanism, a steering wheel priority valve 6, a change-over valve 7, a mode change valve 8, a tank 9 and an unload valve (a flow control valve) 12.

The steering wheel and the joystick or the automatic steering mechanism are elements operated for steering. By operating these elements, the steering cylinder 1 is expanded/contracted and a front frame or a tire of the construction/transport/farm machine is rotated.

In this steering device, to provide hydraulic oil from the pump 3 directly into the steering cylinder 1 through the steering wheel control valve 4 or the electromagnetic control valve 5 for lever or automatic steering, a steering valve 2 is not provided.

The change-over valve 7 for changing the steering wheel priority valve 6 comprises a two-port two-position configuration that closes a drain oil passage of the steering wheel priority valve 6 using by means of load pressure generated when the steering wheel control valve 4 is operated.

Then when the steering wheel is operated, the hydraulic oil is input into the steering wheel control valve 4. At this time, the change-over valve 7 for changing the steering wheel priority valve 6 senses the load pressure (higher pressure) generated when the steering wheel control valve 4 is operated and the change-over valve 7 closes the drain oil passage of the steering wheel priority valve 6 by means of the pressure. Thereby, when the steering wheel is operated, the hydraulic oil from the electromagnetic control valve 5 for lever or automatic steering is blocked by the steering wheel priority valve 6 and the steering wheel operation is prioritized even if the joystick is misoperated by an operator who touches the joystick accidentally.

According to this steering device, a mechanism for prioritizing the steering wheel operation is realized with a simple configuration and also the mechanism can be operated stably by constituting the change-over valve 7 for changing the steering wheel priority valve 6 so that the change-over valve 7 is comprised the two-port two-position configuration that blocks the drain oil passage of the steering wheel priority valve 6 by the means of the load pressure generated when the steering wheel control valve 4 is operated.

[Mode Change Valve Operation in Open Center System]

Figure 7:
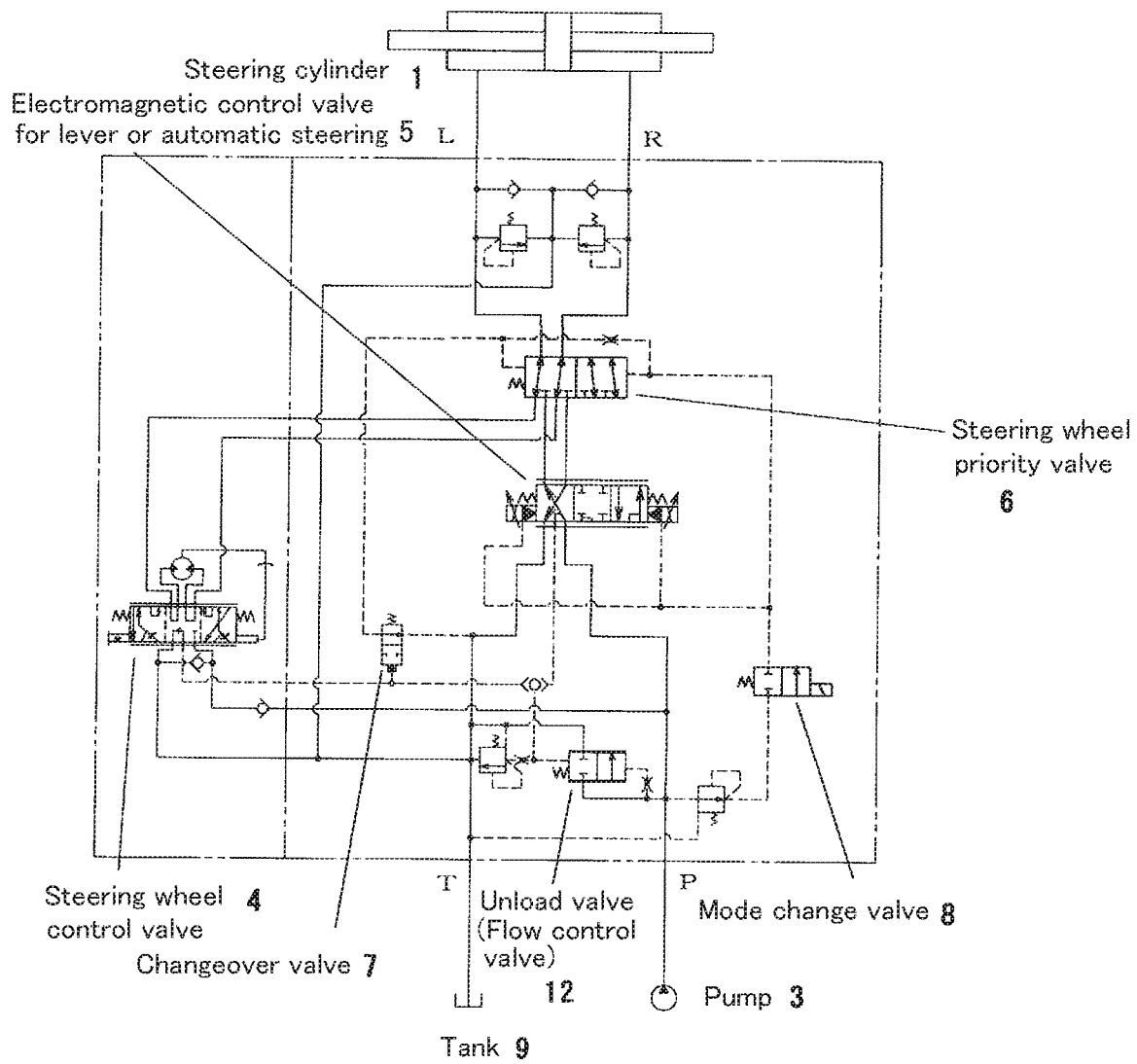
FIG. 7 is an explanatory drawing illustrating a system configuration (Mode change valve operation in open center system) of a steering device of a construction/transport/agricultural machine of invention 3 of the present invention.

FIG. 7 is illustrating a system configuration (Mode change valve operation in open center system) of the steering device of the construction/transport/agricultural machine of invention 3 of the present invention.

This steering device comprises the mode change valve 8 for changing a steering wheel operation or a lever or automatic steering operation in a pilot oil passage for changing the steering wheel priority valve 6. Then, a pilot oil passage is blocked by this mode change valve 8 operated by an external signal so that the electromagnetic control valve 5 for lever or automatic steering and the steering cylinder 1 become in a non-communicated state. Therefore, when the electromagnetic control valve 5 for lever or automatic steering has neutral return trouble, the dangerous situation can be easily avoided without operating continuously the steering wheel control valve 4.

[Load Reaction Mechanism Operation in Open Center System]

Figure 8:
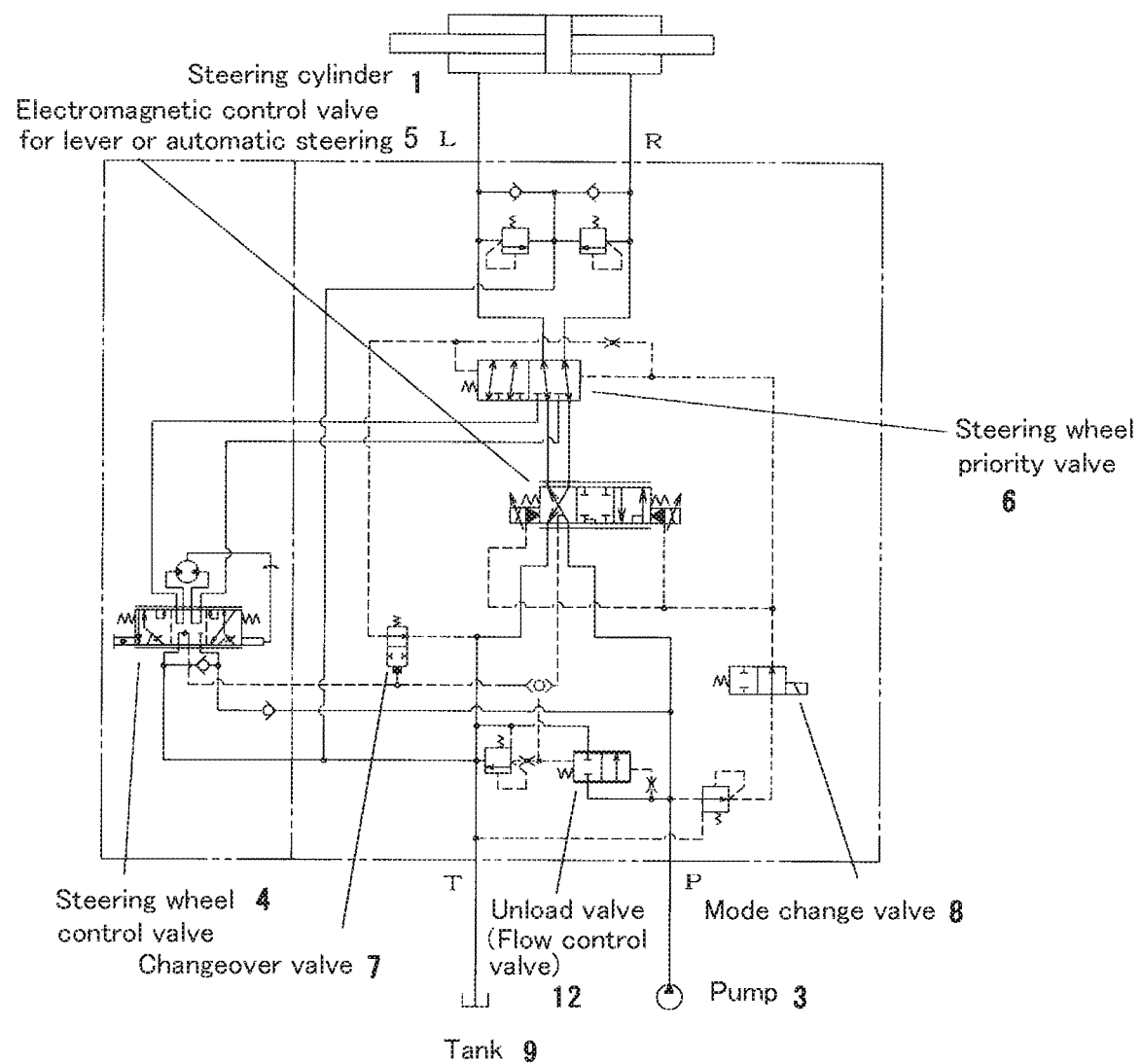
FIG. 8 is an explanatory drawing illustrating a system configuration (Load reaction mechanism operation in open center system) of a steering device of a construction/transport/agricultural machine of invention 3 of the present invention.

FIG. 8 is illustrating a system configuration (Load reaction mechanism operation in open center system) of the steering device of the construction/transport/agricultural machine of invention 3 of the present invention.

Also, in this steering device, a selector valve is used as the steering wheel priority valve 6 and comprises a stage for communicating the steering wheel control valve 4 and steering cylinder 1, and a stage for communicating the electromagnetic control valve 5 for lever or automatic steering and the steering cylinder 1. Therefore, when adopting the steering wheel control valve 4 for a load reaction mechanism that transmits load reaction force of a road surface to the steering wheel through the steering cylinder 1, the risk that the steering wheel rotates accidentally in the reverse direction can be prevented while the electromagnetic control valve 5 for lever or automatic steering is being operating.

As described above, the steering devices of the construction/transport/farm machines of the present invention is explained based on embodiments. However the present invention is not limited to the configurations of the embodiments as described above, but its configuration can be able to change by properly combining the configurations described in each embodiment, etc., without deviating from the purpose.

INDUSTRIAL APPLICABILITY

A steering device of the construction/transport/farm machine of the present invention, which allows a steering operation by a steering wheel operation and a lever operation (or an automatic steering), is realized a mechanism for prioritizing the steering wheel operation with a simple configuration and also the mechanism is operated stably so that it can be used preferably for use for a steering device of construction/transport/farm machine.

REFERENCE SIGNS LIST

1 Steering cylinder
2 Steering valve
3 Pump
4 Steering wheel control valve
5 Electromagnetic control valve for lever or automatic steering
6 Steering wheel priority valve
7 Change-over valve
8 Mode change valve
9 Tank
10 Main pump
11 Priority valve
12 Unload valve (Flow control valve)

The invention claimed is:

1. A steering device for a construction/transport/agricultural machine comprising: a steering cylinder, a steering valve, a pump, a steering wheel control valve, an electromagnetic control valve for lever or automatic steering, a steering wheel priority valve, and a change-over valve for sensing load pressure generated when said steering wheel control valve is operated and for changing said steering wheel priority valve by said pressure, wherein said change-over valve for changing said steering wheel priority valve comprises a two-port two-position configuration for closing a drain oil passage of said steering wheel priority valve by using said load pressure generated when said steering wheel control valve is operated.

2. The steering device for the construction/transport/agricultural machine according to claim 1, further comprising a mode change valve for changing a steering wheel operation or a lever or automatic steering operation to said pilot oil passage for changing said steering wheel priority valve, wherein said pilot oil passage is blocked by said mode change valve operated by an external signal so that said electromagnetic control valve for lever or automatic steering and said steering cylinder become in a non-communicated state.

3. A steering device for a construction/transport/agricultural machine comprising: a steering cylinder, a priority valve, a pump, a steering wheel control valve, an electromagnetic control valve for lever or automatic steering, a steering wheel priority valve, and a change-over valve for sensing load pressure generated when said steering wheel control valve is operated and for changing said steering wheel priority valve by said pressure, wherein said change-over valve for changing said steering wheel priority valve comprises a two-port two-position configuration for closing a drain oil passage of said steering wheel priority valve by using said load pressure generated when said steering wheel control valve is operated.

4. The steering device for the construction/transport/agricultural machine according to claim 3, wherein a selector valve is used as said steering wheel priority valve and comprises a stage for communicating said steering wheel control valve and said steering cylinder, and a stage for communicating said electromagnetic control valve for lever or automatic steering and said steering cylinder.

5. A steering device for a construction/transport/agricultural machine comprising: a steering cylinder, an unload valve, a pump, a steering wheel control valve, an electromagnetic control valve for lever or automatic steering, a steering wheel priority valve, and a change-over valve for sensing load pressure generated when said steering wheel control valve is operated and for changing said steering wheel priority valve by said pressure, wherein said change-over valve for changing said steering wheel priority valve comprises a two-port two-position configuration for closing a drain oil passage of said steering wheel priority valve by using said load pressure generated when said steering wheel control valve is operated.

* * * * *